H. S. HUNTER.
MILLING SAW.
APPLICATION FILED JULY 7, 1914.
1,144,131.
Patented June 22, 1915.
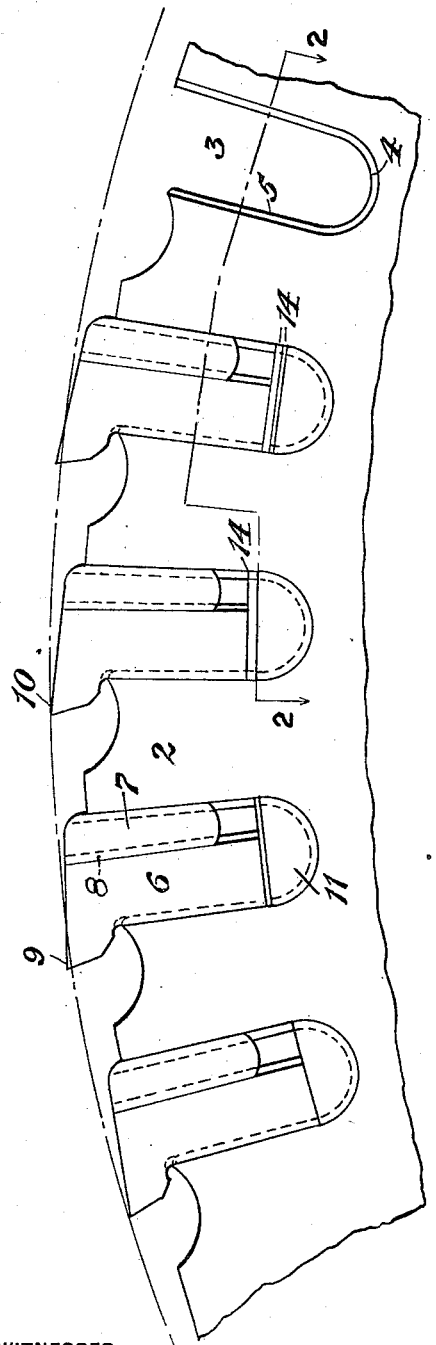
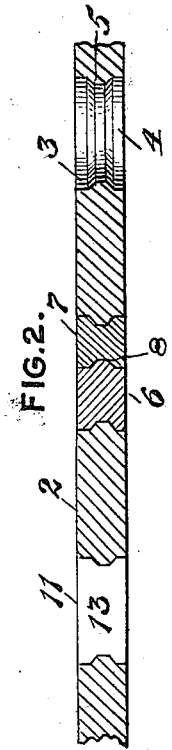
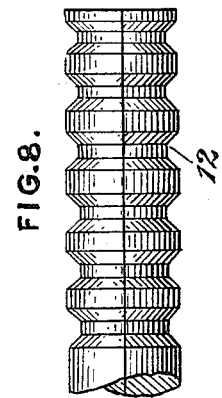
WITNESSES
INVENTOR

UNITED STATES PATENT OFFICE.

HARRY S. HUNTER, OF PITTSBURGH, PENNSYLVANIA, ASSIGNOR TO HUNTER SAW & MACHINE COMPANY, OF PITTSBURGH, PENNSYLVANIA, A CORPORATION OF PENNSYLVANIA.

MILLING-SAW.

1,144,131.  Specification of Letters Patent.  Patented June 22, 1915.

Application filed July 7, 1914. Serial No. 849,589.

*To all whom it may concern:*

Be it known that I, HARRY S. HUNTER, a citizen of the United States, and resident of Pittsburgh, in the county of Allegheny and State of Pennsylvania, have invented certain new and useful Improvements in Milling-Saws, of which the following is a specification.

The object of this invention is to provide simple and efficient means for determining the position or adjustment of removable saw teeth, the invention being designed primarily for metal cutting saws, although applicable to removable-tooth saws generally without regard to their use.

Heretofore the tooth-adjusting means has been variously arranged at the inner ends of the sockets and require machine work in the preparation of slots and cavities for their reception. The present invention obviates these expensive blade-weakening constructions by taking care of the adjustment wholly within the sockets, all special machine work for the sockets or teeth, or both, being avoided.

In the accompanying drawings, Figure 1 is a segment of the periphery of a metal saw embodying the invention. Fig. 2 is a cross-section taken on line 2—2 of Fig. 1. Figs. 3, 4 and 5 are detail views of the removable head or block at the inner end of each of the tooth sockets, and Figs. 6 and 7 are similar views of the filler strips for determining the desired projection of the teeth. Figs. 8 and 9 are, respectively, side elevation and end view of two bars or blanks of half-round section from which the removable abutment-forming blocks may be economically produced.

Referring to the drawings, 2 designates the blade of a milling or other saw which is formed with the usual tooth-confining sockets 3. In the present adaptation the inner extremity of each socket is rounded or semi-circular, as indicated at 4, and projecting centrally from the edges or walls of the sockets, including its curved inner portion, is the bead 5.

6 are the removable teeth or cutters, and 7 the wedges for securing them in the sockets. The edges of cutters 6 and wedges 7 are curved as shown to embrace bead 5, and the meeting edges of the cutters and wedges are similarly interlocked at 8 to preclude lateral displacement. Some of the teeth may be formed for roughing as at 9, and others for finishing as at 10 in accordance with the usual practice. It will be understood, however, that the cutters may be variously secured without departing from the present invention.

The inner end of each of sockets 3 is provided with an abutment for the cutter which the latter may directly engage as when a cutter is new, or which may support interposed spacing strips when the cutter becomes worn. In the present adaptation the abutment is in the form of a removable block 11 which is curved to fit the inner end of the socket and grooved at 12 to embrace bead 5. The outer extremity 13 of each block is flat and parallel with the inner end extremity of the cutter to provide a bearing surface for the latter when no spacing elements are interposed, as shown at the left-hand side of Fig. 1. To maintain the cutters properly projected after their length has been decreased by wear and filing or grinding incident to sharpening, plate-like filler strips 14 are interposed between the cutter and block 11, the extremities of the strips being grooved at 15 to embrace bead 5, and as the strips correspond in width to the thickness of the teeth and blocks 11 they simply constitute continuations or extensions of the latter. Strips varying in thickness may be provided, and a strip of the required thickness or two or more strips of different thicknesses may be inserted as may be necessary to hold the cutter properly projected.

The inner extremity 4 of each socket is preferably curved in the arc of a circle, being substantially semicircular, as this formation may be conveniently and economically produced by a milling tool, and for the further reason that a concentrically curved socket end is adapted to receive a curved or semi-circular abutment-forming block the shape of which is conducive to economic manufacture. With the abutment blocks semi-circular, they may be produced from two bars of half-round section, illustrated in Figs. 8 and 9, the bars being placed in a lathe, and the grooves 12 for a series of blocks cut therein, after which the bars are cut transversely to form blocks of the desired thickness. The abutment blocks can thus be produced rapidly with much accuracy and with the exercise of less machine work than would be possible with blocks of other shape. It will be understood, however, that the invention is not restricted to either the concentrically curved socket ends 4, or to abutment-forming blocks produced as herein described.

The invention obviates adjusting screws and similar devices and no special machine work is necessary either in connection with the sockets or the blade and the strength of the latter is in no way impaired.

I claim:

1. A one-piece saw blade having a socket-forming depression extending inwardly from its working edge and with the inner extremity of the socket semi-circular, a cutter removably fitting the socket and having a straight inner extremity, cutter securing means, and a semi-circular block fitting the semi-circular inner extremity of the socket, the block having a straight face disposed toward the outer end of the socket and parallel with and adapted to form an abutment for the straight inner extremity of the cutter.

2. The combination of a saw blade formed with a socket and provided with a cutter abutment at its inner end, a cutter secured in the socket, and spacing strips adapted to be interposed between the cutter and the abutment with opposite ends of the strips interlocking with the socket.

3. The combination of a saw blade formed with a beaded socket and provided with a cutter abutment, a cutter secured in the socket, and spacing strips interposed between the abutment and the cutter and notched at their ends to embrace the socket bead.

4. The combination of a saw blade formed with a beaded socket, a removable abutment-forming block fitting the inner end of the socket and grooved to embrace the bead thereof, a cutter within the socket, and grooved spacing strips adapted to be interposed between the block and the cutter and embrace the socket bead.

5. The combination of a saw blade formed with a beaded socket rounded at its inner end, a rounded abutment-forming block fitting said end and grooved to embrace the socket bead, a cutter within the socket, and spacing strips grooved at their ends to embrace the socket bead and adapted to be interposed between the abutment block and the cutter.

In testimony whereof, I affix my signature in presence of two witnesses.

HARRY S. HUNTER.

Witnesses:
W. G. DOOLITTLE,
F. E. GAITHER.